United States Patent
Okamoto

(10) Patent No.: US 8,724,958 B2
(45) Date of Patent: May 13, 2014

(54) REPRODUCING APPARATUS, REPRODUCING SYSTEM AND SERVER

(75) Inventor: Katsunori Okamoto, Osaka (JP)

(73) Assignee: Panasonic Corporation, Osaka (JP)

( * ) Notice: Subject to any disclaimer, the term of this patent is extended or adjusted under 35 U.S.C. 154(b) by 91 days.

(21) Appl. No.: 13/051,326

(22) Filed: Mar. 18, 2011

(65) Prior Publication Data

US 2011/0280548 A1    Nov. 17, 2011

(30) Foreign Application Priority Data

Mar. 18, 2010 (JP) .................................. 2010-062329
Mar. 17, 2011 (JP) .................................. 2011-058945

(51) Int. Cl.
*H04N 5/932* (2006.01)

(52) U.S. Cl.
USPC .......................................... 386/201; 386/234

(58) Field of Classification Search
None
See application file for complete search history.

(56) References Cited

U.S. PATENT DOCUMENTS

2007/0209499 A1* 9/2007 Kotani .............................. 84/644
2007/0237136 A1* 10/2007 Sako et al. .................... 370/368
2008/0013512 A1* 1/2008 Yurugi .......................... 370/338
2008/0028294 A1* 1/2008 Sell et al. ...................... 715/234
2008/0131085 A1* 6/2008 Ikeda et al. ..................... 386/99
2009/0031069 A1* 1/2009 Habuto et al. ................. 710/303

FOREIGN PATENT DOCUMENTS

JP       2006-164229       6/2006

* cited by examiner

*Primary Examiner* — William C Vaughn, Jr.
*Assistant Examiner* — Eileen Adams
(74) *Attorney, Agent, or Firm* — Wenderoth, Lind & Ponack, L.L.P.

(57) ABSTRACT

An object of a reproducing apparatus according to the present invention is to solve a problem in that, when video data and music data of BGM are played simultaneously as they are, one of them is finished while the other is still playing, and accordingly, this does not provide an effect of sufficiently satisfying the user even though the BGM is inserted. The reproducing apparatus according to the present invention includes a recording medium capable of storing one or a plurality of video data, a network communication section for receiving, from a music server via a network, music-reproduction data having a reproduction time of almost the same length as a reproduction time of the video data stored in the recording medium, and a reproduction control section for simultaneously reproducing the music-reproduction data received by the network communication section and the video data stored in the recording medium.

15 Claims, 6 Drawing Sheets

Fig.5

| PRIORITY ORDER OF PART SELECTION | (4) | (2) | (3) | (1) | (5) |
|---|---|---|---|---|---|
| PART | INTRODUCTION | PART A | PART B | HOOK-LINE | ENDING |
| TIME OF PART | Ti | Ta | Tb | Th | Te |

Tm

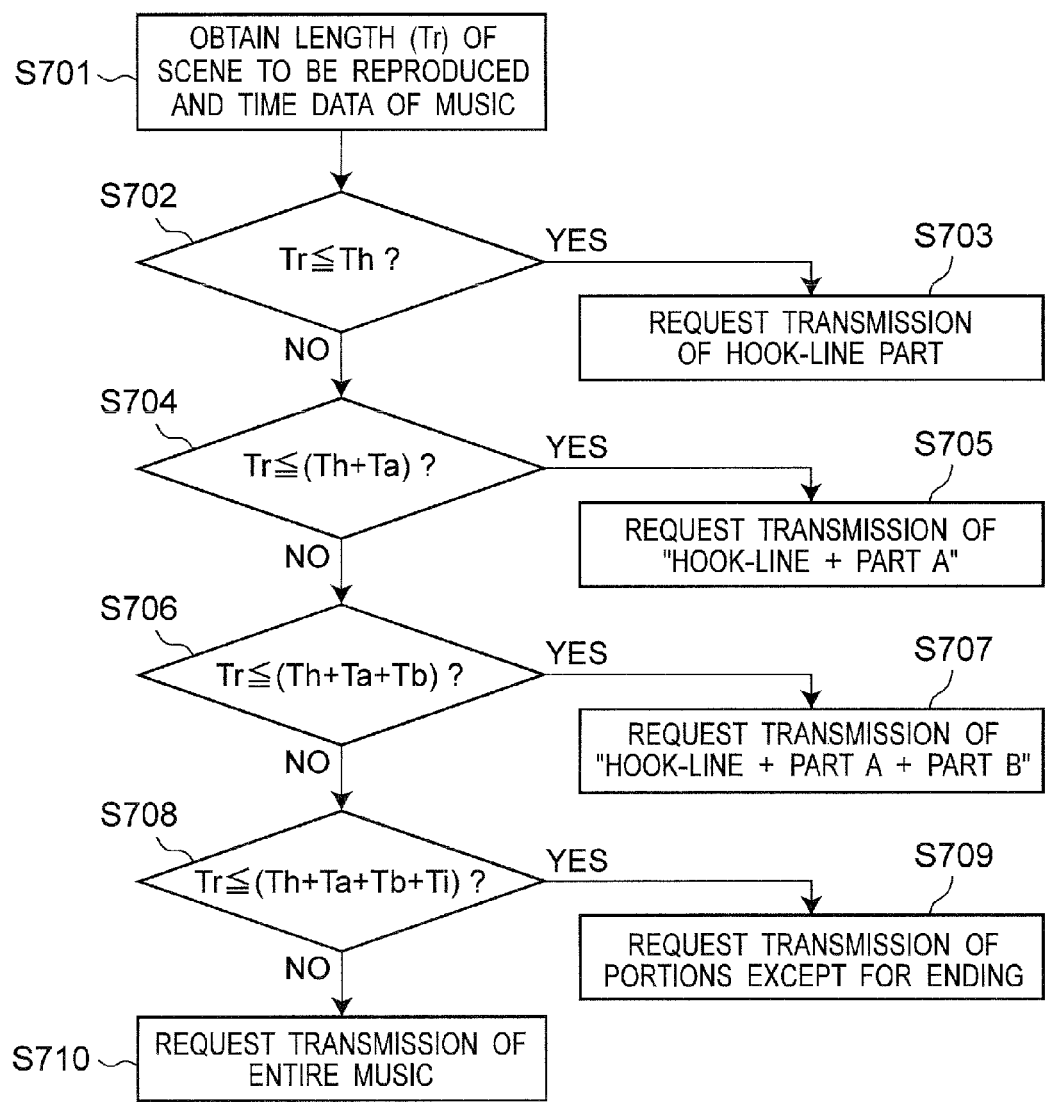

REPRODUCING APPARATUS, REPRODUCING SYSTEM AND SERVER

BACKGROUND OF THE INVENTION

The present invention relates to a reproducing apparatus and a reproducing system for reproducing video data captured and recorded by a video camera etc., and a server. More particularly, the present invention relates to a reproducing apparatus and a reproducing system capable of not only reproducing video data but also inserting so-called background music (BGM), and a server to be used therefor.

In recent years, video capturing apparatuses such as video cameras more and more increase range of function, and a video capturing apparatus having a function of inserting BGM, when recorded video data are edited, in addition to audio data recorded with video recording is already put into practical use.

Some of such video cameras and the like having a function of inserting BGM are configured to store music selectable as BGM. In such video cameras, if a user selects a piece of music as BGM during reproduction, the video camera plays the selected music data instead of playing audio data collected when the video data was captured.

However, when the video camera is configured to store music as described above, since the capacity of storing music in the video camera is limited, there is a problem in that the number of music selectable as BGM is naturally limited.

In relation to such a problem, for example, Patent document 1 (Japanese Patent Laid-Open Publication No. 2006-164229) discloses an information reproducing apparatus which is configured to search an external server for music that was popular when the images were captured by using the shooting date as a key, and download the music data, when a so-called slide show is executed to successively reproduce images including shooting date information captured by a digital camera.

However, when video data captured by using a video camera etc. and music data of the music selected as BGM are reproduced simultaneously, a reproduction time of the video data and a reproduction time of the music data selected and downloaded are not the same (or do not have the same or almost the same length) in many cases. Therefore, when both are reproduced simultaneously as they are, and the reproduction time of the video data is longer than that of the music data, only the video will be continuously played without any music even though the BGM has already been finished. On the contrary, the reproduction time of the video data is shorter than that of the music data, the reproduction of the video may be finished before the BGM is still playing, and the user may have no clue as to what music is inserted as BGM.

In other words, when the video data and the BGM whose reproduction times can be hardly expected to be the same or almost the same length in general are played simultaneously as they are, one of them is finished while the other is still playing. This causes the user to feel incompleteness, and there is a problem in that, even though the BGM is inserted, this does not provide an effect of sufficiently satisfying the user.

In the conventional art, even though an external server is used, music data of the music searched by the external server are downloaded regardless of reproduction history and the like in the reproducing apparatus. In this case, there is a problem in that the music already downloaded and used as BGM may be selected again. This provides a disadvantageous result to a user when the user wants to apply unique impression to each piece of video data.

SUMMARY OF THE INVENTION

A basic object of the present invention is to provide a reproducing apparatus and a reproducing system capable of playing, as BGM, music-reproduction data having a reproduction time that is neither too longer or too shorter than a reproduction time of video data, when the video data recorded in the reproducing apparatus and the music data downloaded from the external server as BGM are played simultaneously, and a server utilized therefor.

Accordingly, a reproducing apparatus according to the present invention includes storage device capable of storing one or a plurality of video data, receiving unit for receiving, from an external server via a network, music-reproduction data having a reproduction time of almost the same length as a reproduction time of the video data stored in the storage device, and reproduction controller for simultaneously reproducing the music-reproduction data received by the receiving unit and the video data stored in the storage means.

Further, a reproducing system according to the present invention includes a reproducing apparatus for reproducing video data and an external server connected to the reproducing apparatus via a network and transmitting music-reproduction data played together with the video data to the reproducing apparatus, wherein the reproducing apparatus includes storage device capable of storing one or a plurality of video data, receiving unit for receiving, from an external server via a network, music-reproduction data having a reproduction time of almost the same length as a reproduction time of the video data stored in the storage device, and reproduction controller for simultaneously reproducing the music-reproduction data received by the receiving unit and the video data stored in the storage device.

According to the above constitutions, the music-reproduction data having a reproduction time of almost the same length as a reproduction time of the video data stored in the storage device are received from the external server and are reproduced together with the video data.

In the above cases, the receiving unit may receive, as the music-reproduction data, part data of some of a plurality of parts constituting an entirety of the music corresponding to the music-reproduction data.

According to this constitution, even when the reproduction time of the video data is shorter than that of the entire music, the reproduction time of the music-reproduction data received from the external server by the receiving unit can be configured to have almost the same length as the reproduction time of the video data.

In this case, the music-reproduction data preferably includes part data corresponding to a hook-line of the music.

According to this constitution, the music-reproduction data include the part data corresponding to the most impressive hook-line in the music, whereby a user can immediately know which music is played as the BGM simultaneously with the reproduction of the video data.

Further, in the above cases, the receiving unit may receive part information about the plurality of parts of the music including the reproduction time of each piece of the part data from the external server via the network, and wherein the reproducing apparatus may further include processing unit for comparing the reproduction time of each piece of the part data received by the receiving unit and the reproduction time of the video data stored in the storage device, thus performing part-construction processing of the music-reproduction data.

According to this constitution, the part-construction processing of the music-reproduction data can be performed by the reproducing apparatus side.

Alternatively, the reproducing apparatus may further include transmitting unit for transmitting information about the reproduction time of the video data stored in the storage device to the external server via the network, and wherein the external server performs part-construction processing of the music-reproduction data by comparing the reproduction time of each piece of the part data and that of the video data.

According to this constitution, the part-construction processing of the music-reproduction data can be performed by the external server, and this simplifies the configuration of the reproducing apparatus.

In the above cases, the receiving unit preferably receives ranking data of a particular date/time from the external server via the network, and wherein the reproducing apparatus preferably includes a selecting section for selecting a piece of music to be reproduced together with video data to be currently reproduced, on the basis of the ranking data received by the receiving unit and data about music already reproduced together with the already reproduced video data.

According to this constitution, the music reproduced together with the video data to be currently reproduced is selected on the basis of the ranking data and the data about the music already reproduced together with the already reproduced video data. Therefore, the music already downloaded and used as the BGM will not be selected again, and an impression peculiar to each piece of video data can be applied. In other words, the same music data are not used for other video data, and the user can enjoy variety of music as BGM without performing any editing process.

Further, a server according to the present invention includes storage device storing one or a plurality of music-reproduction data, receiving unit for receiving, from an external apparatus via a network, information about video data stored in the external apparatus, and processing unit for comparing a reproduction time of the video data received by the receiving unit and a reproduction time of part data of some of a plurality of parts constituting the music-reproduction data stored in the storage device, thus performing part-construction processing of the music-reproduction data.

According to this constitution, the music-reproduction data which is processed in the part-construction processing and has the reproduction time of almost the same length as that of the video data stored in the external apparatus can be provided to the external apparatus.

According to the present invention, music-reproduction data having a reproduction time that is neither too longer or too shorter than a reproduction time of video data can be reproduced as BGM, when the video data recorded in the reproducing apparatus and the music data downloaded from the external server as BGM are played simultaneously.

BRIEF DESCRIPTION OF THE DRAWINGS

The present invention will be further explained in detail with reference to appended drawings.

FIG. 5 is a schematic diagram illustrating an example of part-construction of a piece of music;

FIG. 7 is a flowchart illustrating part-construction processing of music-reproduction data in the external server.

DETAILED DESCRIPTION OF THE PREFERRED EMBODIMENTS

1. First Embodiment

A reproducing system including a reproducing apparatus and an external server according to the first embodiment of the present invention will be hereinafter explained with reference to appended drawings.

1-1. System Constitution

Figure 1:
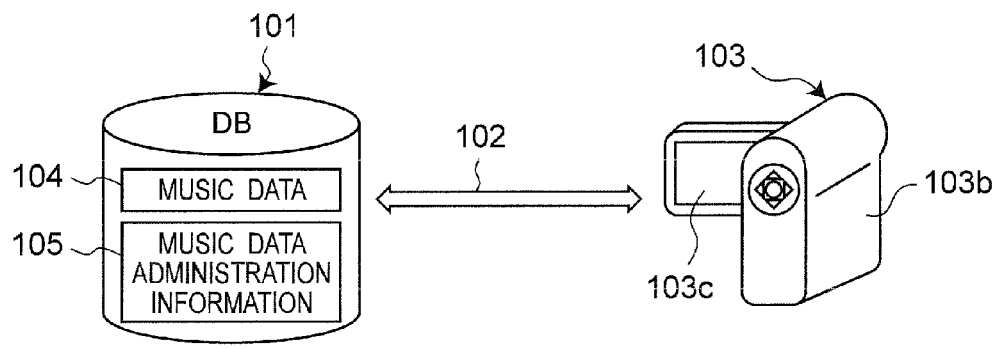
FIG. 1 is a schematic drawing schematically illustrating a configuration of a reproducing system according to the first embodiment of the present invention.

FIG. 1 is a schematic drawing schematically illustrating a configuration of a reproducing system including a reproducing apparatus and a music database serving as an external server (hereinafter, appropriately referred to as DB) according to the first embodiment of the present invention. As shown in the figure, a music DB 101 and a reproducing apparatus 103 are connected to each other via a network 102 such as the Internet. In other words, information, data, and the like exchanged between the music DB 101 and the reproducing apparatus 103 are transmitted via the network 102.

The music DB 101 stores data such as the music data 104 and music data administration information 105. The music data 104 is data itself of each piece of music about those stored in the music DB 101. The music data administration information 105 includes, for example, the following information about the music stored in the music DB 101.

Ranking information representing the frequency each piece of music is downloaded within a certain period such as a week or a month.

Genre information representing a genre of each piece of music.

Part information about a plurality of parts constituting each piece of music. In other words, information representing a part construction including introduction, melody A (part A), melody B (part B), hook-line, ending, and the like.

The reproducing apparatus 103 is constituted by, e.g., a video camera, and includes operation element (not shown) such as various kinds of switches and buttons with which a user performs operation and a monitor device 103c attached to a main body 103b. In addition, output device for outputting data to an external monitor device (not shown) may be further provided separately from the main body 103b.

In the present embodiment, the reproducing apparatus 103 has a function of playing the video data of recorded video and the music data downloaded from the music DB 101 simultaneously (at a time) as explained later in detail.

1-2. Constitution of Reproducing Apparatus

Figure 2:
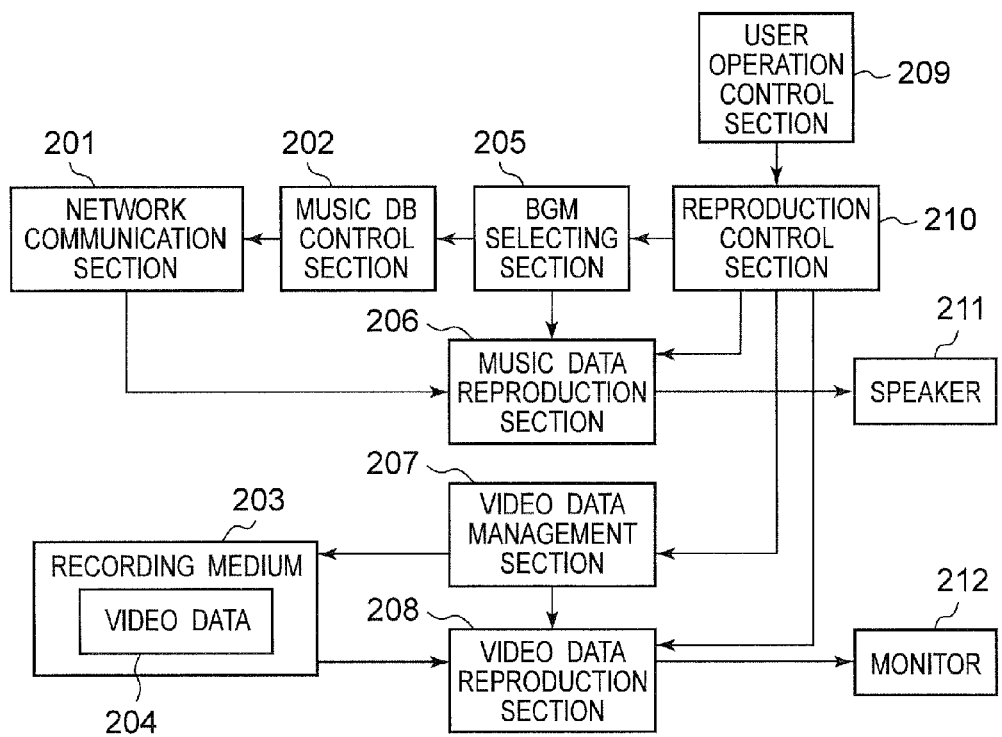
FIG. 2 is a block diagram illustrating a constitution of a reproducing apparatus according to the first embodiment.

FIG. 2 is a block diagram schematically illustrating a constitution of a control system for controlling reproduction operation performed by the reproducing apparatus 103. For example, in the control system, a main portion is constituted by a microcomputer. And, the control system includes many control circuits and the like having functions explained below. Instead of the above hardware constitution, the same control may be achieved with execution software implemented in the reproducing system or the reproducing apparatus 103.

A network communication section 201 performs communication processing for communicating with the music DB 101 via the network 102. The network communication section 201 may be adapted to wired communication, or may be adapted to wireless communication. Alternatively, the network communication section 201 may be adapted to both of the wired communication and wireless communication.

A music DB control section 202 has a function of generating data to be transmitted to the music DB 101 and giving a command for transmitting generated data to the network communication section 201. In addition, the music DB control section 202 includes a function of receiving response data of the music DB 101 in response to the data transmitted from the network communication section 201.

Video data 204 are recorded to, for example, a recording medium 203. The recording medium 203 may be any one of a semiconductor medium, a hard disk drive, an optical disk medium, and the like.

A background music (BGM) selecting section 205 has a function of giving a command for obtaining ranking data from the music DB control section 202 on the basis of date/time information transmitted from a reproduction control section 210. The BGM selecting section 205 also has a function of performing processing for selecting BGM on the basis of the ranking data obtained in accordance with the command for obtaining the ranking data from the music DB control section 202. This processing for selecting BGM will be explained in detail later.

A music data reproduction section 206 has a function of obtaining music data of a piece of music selected by the BGM selecting section 205 from the music DB 101 and performing reproduction processing of the music data. The construction of the music data of the selected music will be explained in detail later. The music data played by the music data reproduction section 206 are output to a speaker 211 as an audio signal.

A video data management section 207 has a function of obtaining date/time information from the video data 204 recorded in the recording medium 203 in response to the command given by the reproduction control section 210, and transmitting the date/time information to the reproduction control section 210. This video data management section 207 also has a function of performing reproduction processing of the data in the video data 204 specified by the reproduction control section 210 to a video data reproduction section 208 in response to the command given by the reproduction control section 210.

The video data reproduction section 208 has a function of obtaining the specified video data from the video data 204 of the recording medium 203 in response to the command given by the video data management section 207, and performing reproduction processing of the video data. The video data reproduction section 208 outputs video data processed in the reproduction processing to a monitor 212 as a video signal. It should be noted that the monitor 212 may be a monitor device 103c attached to the main body 103b, or may be an external monitor device (not shown) provided separately from the main body 103b.

A user operation control section 209 operates when a user manipulates operation element (not shown) of the reproducing apparatus 103, and provides I/F (interface) such as selection of genre and reproduction start command in accordance with user's intention. The user operation control section 209 has a function of giving a command for starting reproduction operation to the reproduction control section 210 in response to a command given by the user.

The reproduction control section 210 has a function of obtaining date/time information from the video data management section 207 on the basis of a command given by the user operation control section 209, and giving a command for selecting a piece of music to the BGM selecting section 205. Further, the reproduction control section 210 also has a function of giving a command for playing the corresponding video data on the basis of a command given by the user operation control section 209, and giving a command for playing music data of the music selected by the BGM selecting section 205.

1-3. Operation of Reproducing System

Figure 3:
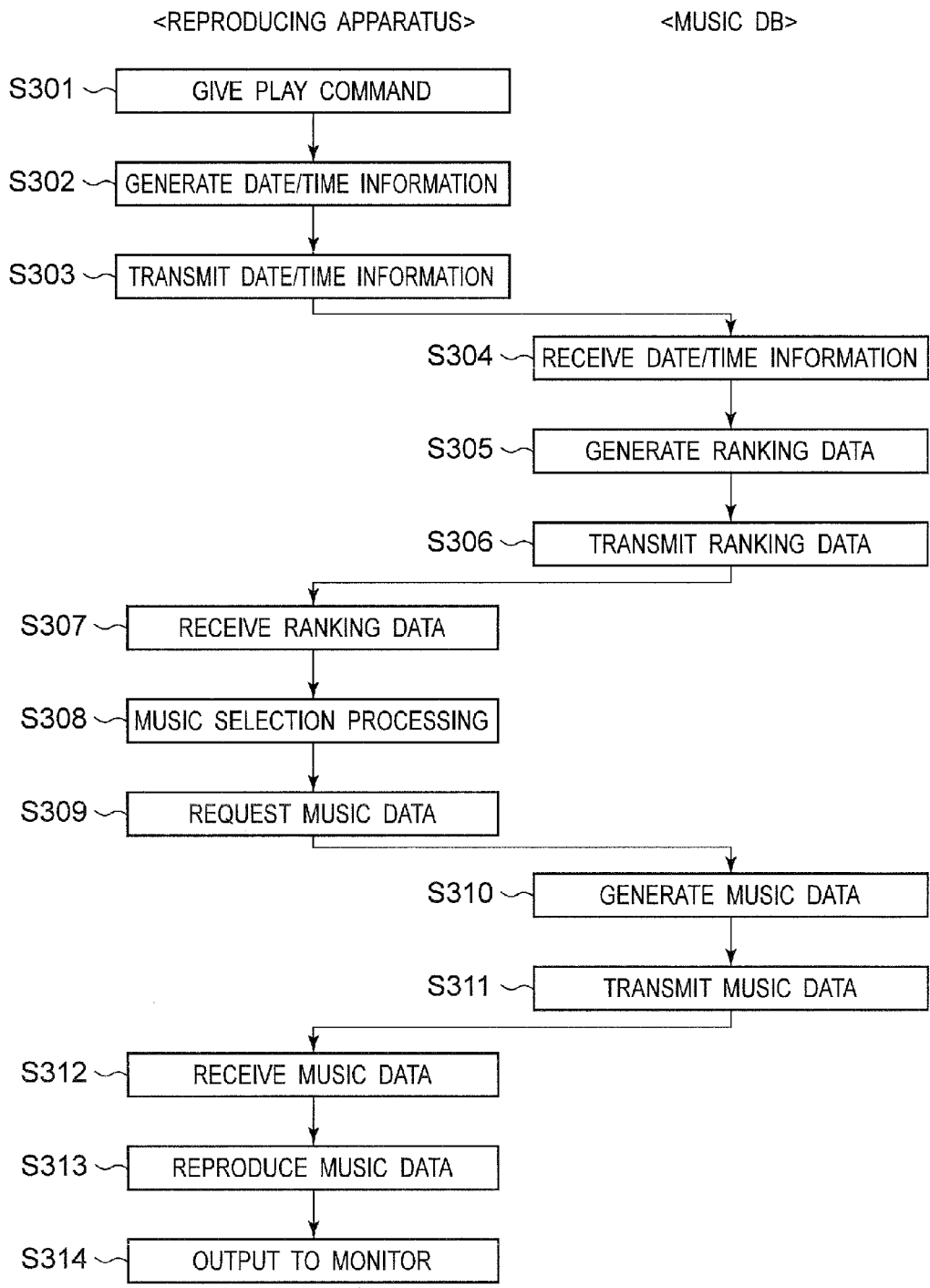
FIG. 3 is flowchart illustrating operation of the reproducing system.

FIG. 3 is flowchart illustrating an example of operation of the reproducing system as shown in FIG. 1.

First, a user manipulates the operation element (not shown) of the reproducing apparatus 103 to operate the user operation control section 209, and selects video data to be played and gives a command for playing the video data (step S301). At this occasion, the user can give a command for selecting a preferred genre to the user operation control section 209.

When a preferred genre was selected, the user operation control section 209 notifies the selected genre to the reproduction control section 210 on the basis of the command given by the user, and gives a command for playing the video data.

Subsequently, the reproduction control section 210 obtains the date/time information of the video data, for which reproduction command is given, from the recording medium 203 via the video data management section 207 (step S302).

Then, the reproduction control section 210 transmits the obtained date/time information and the preferred genre information specified by the user to the BGM selecting section 205, and further gives the BGM selecting section 205 a command for selecting a piece of music to be played together with the video data to be played.

The BGM selecting section 205 transmits the date/time information notified by the reproduction control section 210 to the music DB control section 202. The music DB control section 202 transmits the date/time information via the network communication section 201 to the music DB 101 (step S303).

Corresponding to the execution of step S303 at the reproducing apparatus 103 side, the music DB 101 receives the date/time information from the network communication section 201 of the reproducing apparatus 103 via the network 102 (step S304).

The music DB 101 generates music data of ranking data in a corresponding week based on an information from the administration information 105 on the basis of the received date/time information (step S305). At this occasion, the music DB 101 may also receive information about a target period of the ranking data (more specifically, whether the ranking data are based on each week or based on each month) from the reproducing apparatus 103, and may generate ranking data on the basis of the corresponding period.

When the music DB 101 generates the ranking data, the ranking data are transmitted via the network 102 to the reproducing apparatus 103 (step S306). At this occasion, for each piece of music included in the ranking data, the music DB 101 also transmits the above-mentioned part information about a plurality of parts constitute each piece of music. In other words, the music DB 101 also transmits information representing a part construction (part construction information)

such as introduction, melody A (part A), melody B (part B), hook-line, ending and the like.

Corresponding to the execution of step S306 at the music DB 101 side, the reproducing apparatus 103 receives, by using the network communication section 201, the ranking data and the part construction information for each piece of music which are transmitted via the network 102 (step S307).

The ranking data and the part construction information thus received are transmitted, via the music DB control section 202, to the BGM selecting section 205. The BGM selecting section 205 selects a piece of music from all of the received ranking data, or when the user specifies a preferred genre, the BGM selecting section 205 selects a piece of music from the preferred genre (step S308). The music selection processing in step S308 will be explained later in detail.

When the music selection processing is finished, the BGM selecting section 205 gives the music DB control section 202 a command to request for obtaining music data of the corresponding music from the music DB 101 to (step S309).

Corresponding to the execution of step S309 at the reproducing apparatus 103 side, the music DB 101 receives the request for obtaining the music data, via the network 102, from the network communication section 201 of the reproducing apparatus 103. At this occasion, the information received by the music DB 101 may include not only a number and an identification symbol for identifying the music but also construction information such as a part construction of the identified music.

The music DB 101 generates music data corresponding to the received request for obtaining the music data (step S310), and transmits the music data, via the network 102, to the reproducing apparatus 103 (step S311).

Corresponding to the execution of step S311 at the music DB 101 side, the reproducing apparatus 103 receives, by using the network communication section 201, the music data transmitted via the network 102. The received music data are transmitted from the network communication section 201 to the music data reproduction section 206 (step S312).

When the music data reproduction section 206 completes receiving the music data, the music data reproduction section 206 notifies the reproduction control section 210 that the reception has been completed. When the reproduction control section 210 receives the music data reception completion notification from the music data reproduction section 206, the reproduction control section 210 gives a command for playing the video data to the video data reproduction section 208, and gives a command for playing the received music data to the music data reproduction section 206 (step S313).

The video data reproduction section 208 obtains the video data, for which reproduction command is given, from the video data 204 of the recording medium 203, and performs reproduction processing, thus outputting a video signal to the monitor 212. The music data reproduction section 206 performs reproduction processing of the music data received from the music DB 101, and outputs an audio signal to the speaker 211 (step S314).

Thereby, not only the video data recorded in the recording medium 203 but also the music data of the BGM downloaded from the music DB 101 are played simultaneously (at a time).

1-4. Operation of Music Selection Processing

Figure 4:
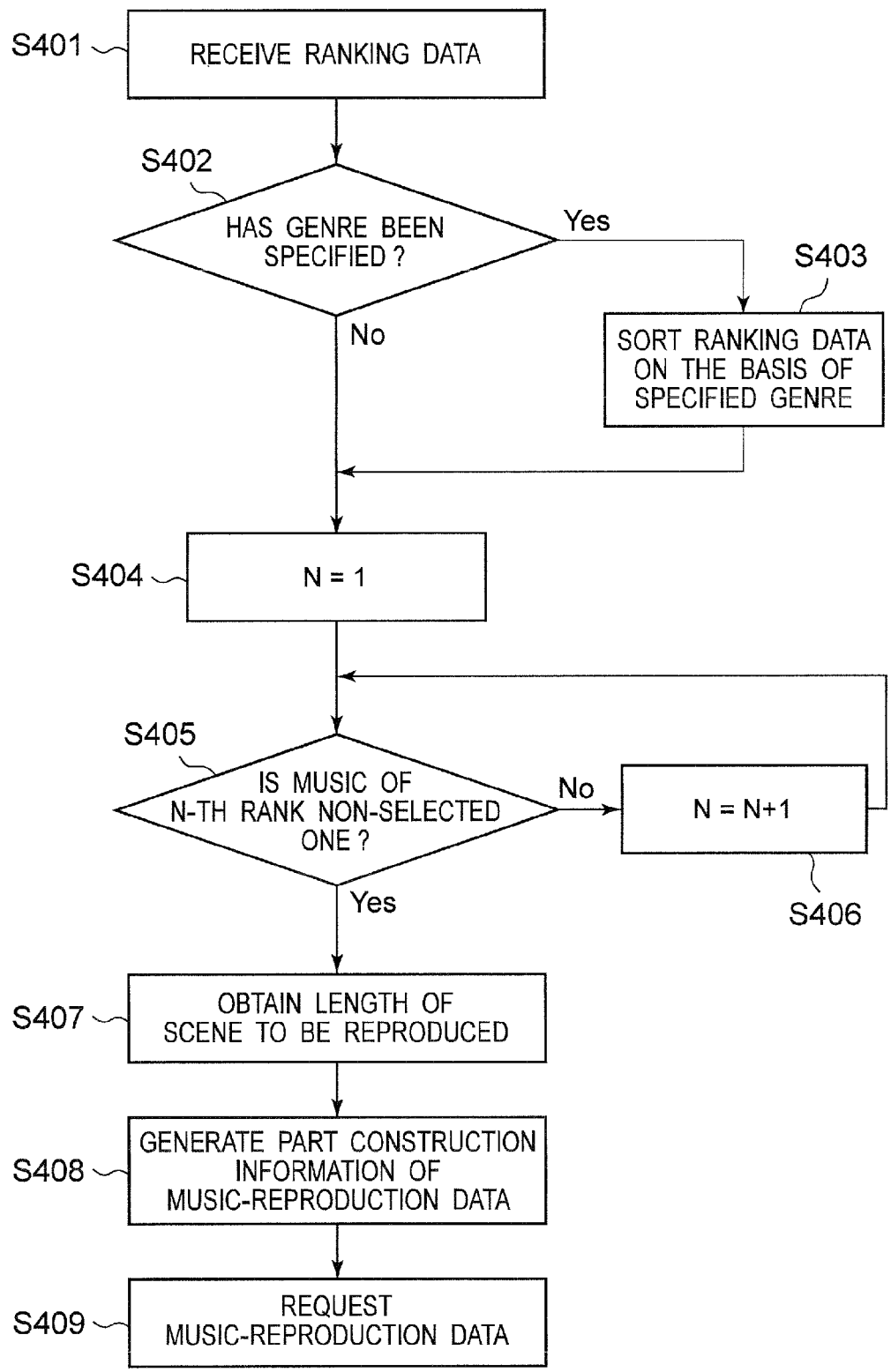
FIG. 4 is a flowchart illustrating operation for selecting music in the reproducing apparatus.

FIG. 4 is a flowchart illustrating details of music selection processing (see step S308 of FIG. 3) performed by the BGM selecting section 205.

First, the BGM selecting section 205 receives, by using the network communication section 201, the ranking data (and construction information for each piece of music) transmitted via the network 102 (step S401). The processing of step S401 corresponds to the processing of step S307 of FIG. 3.

When the ranking data are received, the BGM selecting section 205 determines whether the user has specified a preferred genre to the user operation control section 209 or not (step S402).

When the user has specified a preferred genre (step S402: YES), the BGM selecting section 205 selects and sorts the ranking data on the basis of the specified genre (step S403), and converts the received ranking data.

Thereafter, the BGM selecting section 205 starts music selection processing from a piece of music in the first rank (N=1) in order to select music of higher ranks from among the ranking data (step S404).

On the other hand, when the user has not specified any preferred genre (step S402: NO), the BGM selecting section 205 executes step S404 without sorting the ranking in step S403, thus starting music selection processing from a piece of music in the first rank (N=1).

Subsequently, the BGM selecting section 205 determines whether the music in the first rank (N=1) has already been selected for other video data or not (in other words, determines whether the music is non-selected one) (step S405). When the music data in the first rank are determined to be one which has already been selected for other video data (already selected one), the BGM selecting section 205 selects a piece of music in the second rank (N=2) (step S406). And, the BGM selecting section 205 determines whether the music in the second rank (N=2) is non-selected one or not (step S405).

As described above, the BGM selecting section 205 determines whether the music in the N-th rank is non-selected one or not (step S405), and when the music in the N-th rank is already selected one, a piece of music in the (N+1)-th rank is selected (step S406), and the BGM selecting section 205 determines whether the music in the (N+1)-th rank is non-selected one or not (step S405). Then, this series of steps (step S405 and S406) is repeatedly executed until a non-selected music is found.

Then, when a non-selected music is found in the determination step in step S405 (step S405: YES), the BGM selecting section 205 obtains a reproduction time of video data to be played (a length of a scene to be played) (step S407).

In the present embodiment, the BGM selecting section 205 compares the reproduction time of the video data to be played and the reproduction time of the original music data of the selected music, and for example, the BGM selecting section 205 determines which of the reproduction times is longer. The Based on the determination result, in BGM selecting section 205, part construction data comprising a combination of parts to be played (hereinafter referred to as "music-reproduction data") are generated for the selected music, and the music-reproduction data are constituted so that the reproduction time of the music-reproduction data becomes substantially the same as the length of the reproduction time of the video data (step S408).

Then, the BGM selecting section 205 requests the music DB 101 to provide the music-reproduction data to be transmitted, on the basis of information for specifying the music selected in step S405 and the part construction information about the music-reproduction data generated in step S408 (step S409).

This generation of the music-reproduction data (step S408) and the request of the music-reproduction data (step S409) will be explained later in detail.

1-5. Generation of Music-Reproduction Data

FIG. 5 is a schematic diagram illustrating an example of part construction of a piece of music. In this example, the music includes five parts i.e., introduction, part A (so-called melody A), part B (so-called melody B), hook-line, and ending. In this case, the reproduction time (part time) of each part is represented as follows. The introduction has Ti seconds; the part A has a Ta seconds; the part B has a Tb second; the hook-line has a Th seconds, and the ending has a Te second. And, the reproduction time of the entire music (i.e., the reproduction time of the original music) is represented as Tm seconds.

In the present embodiment, the priority order in selection is defined for each part so that, for example, more impressive part is selected with a higher priority in a piece of music. In the example of FIG. 5, more impressive part "hook-line" is selected with the highest priority, and subsequently, the part A, the part B, the introduction, and the ending are selected in this order of priority.

It should be noted that the priority order in the selection may not always be the same as the order of the part construction in the music-reproduction data (i.e., the priority order in reproduction). For example, when a reproduction time of a piece of music is longer than a reproduction time of video data, and a priority order for five parts is set as follows: hook-line; part A; part B; and introduction except for the ending, the part construction of the music-reproduction data may set for example as follows: the introduction, the hook-line, the part A, and the part B, so that in accordance with the contents of video and music, the part construction can be made in an order preferable for a user.

Figure 6:
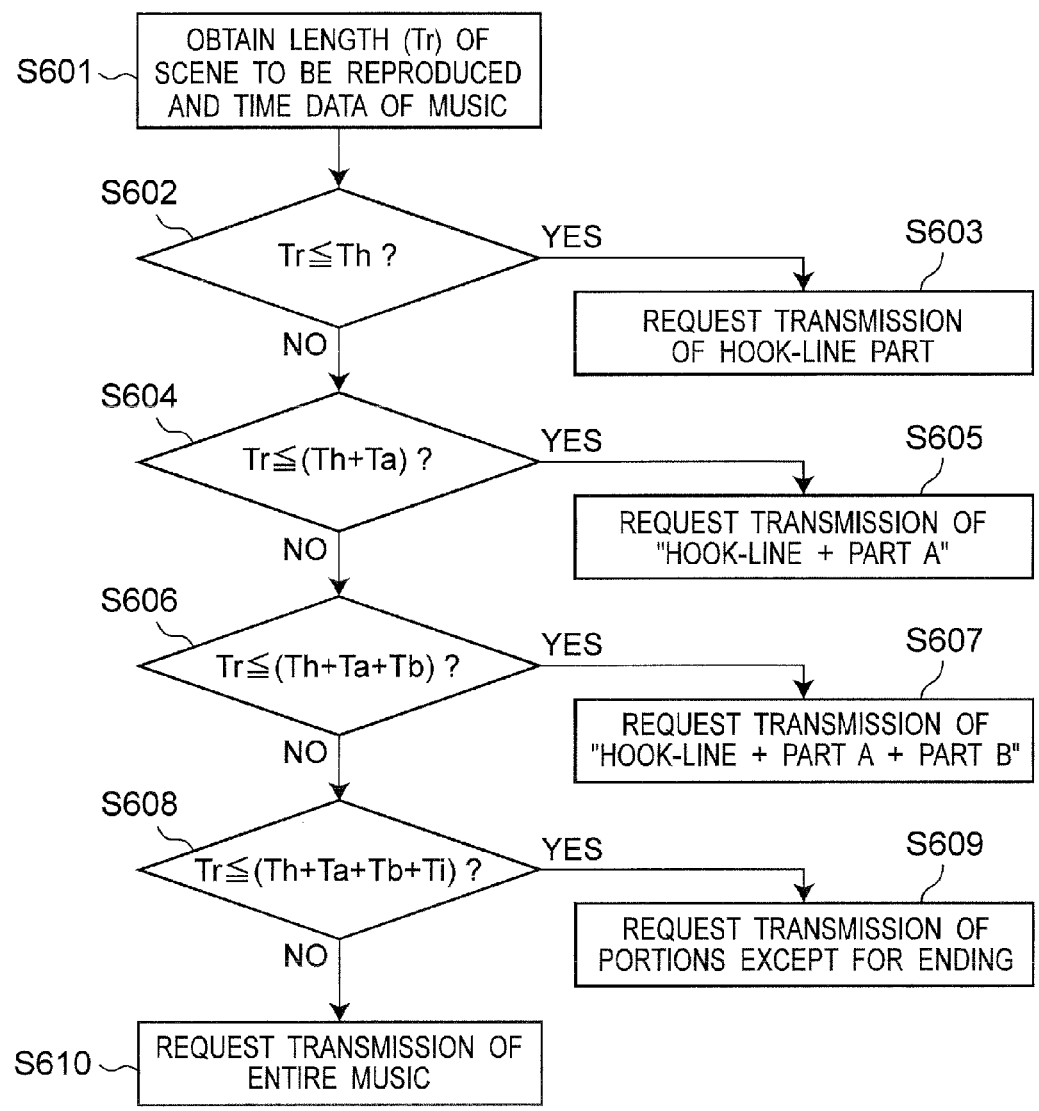
FIG. 6 is a flowchart illustrating part-construction processing of music-reproduction data in the reproducing apparatus.

Next, part-construction processing of music-reproduction data performed by the reproducing apparatus 103 will be explained with reference to a flowchart of FIG. 6.

First, the BGM selecting section 205 obtains a length of a scene to be reproduced, i.e., a reproduction time of the video data 204 (Tr second), and original time data of a piece of music, i.e., a reproduction time of each part as shown in FIG. 5 (Ti, Ta, Tb, Th, Te second) and a reproduction time of the entire music (Tm second) (step S601). The original time data of the music (the reproduction time of each part and the reproduction time of the entire music) are based on part construction information for each piece of music received together with the ranking data in step S307 of FIG. 3 as described above.

Subsequently, the BGM selecting section 205 determines whether the reproduction time Tr of the video data 204 is equal to or less than the reproduction time Th of the hook-line portion (Tr≤Th) or not (step S602). When the determination result is "YES", only the hook-line portion is selected, and the music DB 101 is requested, via the music DB control section 202, to transmit only the part data of the hook-line portion (step S603). In this case, the music-reproduction data are constituted by only the part data of the hook-line portion.

When the determination result in step S602 is "NO", i.e., when the reproduction time Tr of the video data 204 is longer than the reproduction time Th of the hook-line portion, the BGM selecting section 205 determines whether the reproduction time Tr of the video data is equal to or less than a reproduction time (Th+Ta) obtained by adding the part A to the hook-line portion (Tr≤(Th+Ta)) (step S604). When the determination result is "YES", the hook-line portion and the part A are selected, and the music DB 101 is requested, via the music DB control section 202, to transmit the part data of the hook-line portion and the part A (step S605). In this case, the music-reproduction data are constituted by the part data of the hook-line portion and the part A.

When the determination result in step S604 is "NO", i.e., when the reproduction time Tr of the video data 204 is longer than the reproduction time (Th+Ta) obtained by adding the part A to the hook-line portion, the BGM selecting section 205 determines whether the reproduction time Tr of the video data is equal to or less than a reproduction time (Th+Ta+Tb) obtained by adding the part A and the part B to the hook-line portion (Tr≤(Th+Ta+Tb)) or not (step S606). When the determination result is "YES", the hook-line portion, the part A, and the part B are selected, and the music DB 101 is requested, via the music DB control section 202, to transmit the part data of the hook-line portion, the part A, and the part B (step S607). In this case, the music-reproduction data are constituted by the part data of the hook-line portion, the part A, and the part B.

When the determination result in step S606 is "NO", i.e., when the reproduction time Tr of the video data 204 is longer than the reproduction time (Th+Ta+Tb) obtained by adding the part A and the part B to the hook-line portion, the BGM selecting section 205 determines whether the reproduction time Tr of the video data is equal to or less than a reproduction time (Th+Ta+Tb+Ti) obtained by adding the part A, the part B and the introduction portion to the hook-line portion (Tr≤(Th+Ta+Tb+Ti)) or not (step S608). When the determination result is "YES", the parts except the ending portion are selected, and the music DB 101 is requested, via the music DB control section 202, to transmit the part data of the parts except the ending portion (step S609). In this case, the music-reproduction data are constituted by the part data of the hook-line portion, the part A, the part B, and the introduction portion except only the ending portion.

When the determination result in step S608 is "NO", i.e., the reproduction time Tr of the video data 204 is longer than a reproduction time (Th+Ta+Tb+Ti) of the parts except the ending portion, the BGM selecting section 205 selects all the parts of the entire music, and the music DB 101 is requested, via the music DB control section 202, to transmit the part data of all the parts of the entire music (step S610). In this case, the music-reproduction data are constituted by the part data of all the parts of the entire music.

When the reproduction time Tr of the video data 204 is longer than the reproduction time Tm of the entire music, the part construction of the music-reproduction data can be devised in various manners in accordance with the degree of difference. For example, when the reproduction time Tr of the video data is greatly longer than the reproduction time Tm of the entire music (for example, twice as long as the reproduction time Tm), the music-reproduction data may be structured so that the entire music is played repeatedly.

Alternatively, the BGM selecting section 205 may not repeatedly play the same music, and the processing as shown in the steps S405 and S406 in the flowchart of FIG. 4 are performed again so that the music-reproduction data are constituted to select a new non-selected music and play the new music after the currently played music.

1-6. Summary of First Embodiment

As described above, according to the present embodiment, when a user views video data taken with a video camera, music data corresponding to date/time information of shooting can be added as BGM.

In particular, according to the present embodiment, the reproduction time Tr of the video data 204 to be played is compared with the reproduction time Tm of the selected music data, and in accordance with whether which of the reproduction times is longer, part construction data including a combination of parts to be played (music-reproduction data) are generated for the selected music, and the music-reproduction data can be constituted so that the reproduction time of the music-reproduction data has almost the same length as the reproduction time of the video data.

In other words, when the video data 204 recorded in the reproduction apparatus 103 and the music data of the BGM downloaded from the music DB 101 serving as the external server are reproduced simultaneously, the music-reproduction data having the reproduction time Tm that is neither too longer or too shorter than the reproduction time Tr of the video data 204 can be reproduced as the BGM.

In this case, the music-reproduction data are constituted by part data including some of the parts of the plurality of parts constituting the entire selected music, so that even when the reproduction time Tr of the video data 204 is shorter than the reproduction time Tm of the entire music, the reproduction time Tm of the music-reproduction data received from the music DB 101 can be almost the same length as the reproduction time Tr of the video data 204.

In this case, the music-reproduction data are preferably configured to include the part data corresponding to the most impressive hook-line portion in the music, whereby a user can immediately know which music is played as the BGM simultaneously with the reproduction of the video data 204.

Further, preferably, the reproducing apparatus 103 receives the ranking data at a particular date/time from the music DB 101, and on the basis of this ranking data and the data about the music already played simultaneously with the already played video data, apiece of music to be played simultaneously with the video data to be played this time is selected. Accordingly, the music already downloaded and used as the BGM will not be selected again, and an impression peculiar to each piece of video data can be applied. In other words, the same music data are not used for other video data, and a user can enjoy variety of music as BGM without performing any editing processing.

2. Second Embodiment

In the above first embodiment, the part-construction processing of music-reproduction data is performed by the reproducing apparatus 103 side. Instead, the same part-construction processing may be performed by the music DB 101 side.

Next, the second embodiment will be explained with reference to the flowchart of FIG. 7. In the second embodiment, the part-construction processing of music-reproduction data is performed by the music DB 101. In the explanation below, the constituent elements which have same constitutions and same functions as those in the first embodiment are denoted with the same reference numerals, and further explanation thereabout is omitted.

First, the music DB 101 obtains the length of the scene to be reproduced, i.e., the reproduction time of the video data 204 (Tr second), and the title of the selected music from the reproducing apparatus 101 via the network 102. In this case, the title of the music is identified by a code number and the like of the music (step S701).

The music DB 101 stores time data of the music, i.e., the reproduction times of the respective parts as shown in FIG. 5 (Ti, Ta, Tb, Th, Te seconds) and the reproduction time of the entire music (Tm second) for each piece of music.

The music DB 101 executes the series of steps from S702 to step S710 on the basis of the time data of the selected music and the reproduction time Tr of the video data 204 obtained in step S701. The series of steps from S702 to step S710 corresponds to the series of steps from S602 to step S610 in the flowchart of FIG. 6.

That is, when the reproduction time Tr of the video data 204 is equal to or less than the reproduction time Th of the hook-line portion (Tr≤Th), the music DB 101 selects only the hook-line portion, and transmits only the part data of the hook-line portion to the reproducing apparatus 103 via the network 102 (step S703).

When the reproduction time Tr of the video data is equal to or less than the reproduction time (Th+Ta) obtained by adding the part A to the hook-line portion (Tr≤(Th+Ta)), the music DB 101 selects the hook-line portion and the part A, and the part data of the hook-line portion and the part A are transmitted to the reproducing apparatus 103 (step S705).

Further, when the reproduction time Tr of the video data is equal to or less than the reproduction time (Th+Ta+Tb) obtained by adding the part A and the part B to the hook-line portion (Tr≤(Th+Ta+Tb)), the music DB 101 selects the hook-line portion, the part A, and the part B, and the part data of the hook-line portion, the part A, and the part B are transmitted to the reproducing apparatus 103 (step S707).

Still further, when the reproduction time Tr of the video data is equal to or less than the reproduction time (Th+Ta+Tb+Ti) obtained by adding the part A, the part B, and the introduction portion to the hook-line portion (Tr≤(Th+Ta+Tb+Ti)), the music DB 101 selects all the other parts except the ending portion, and all the other parts except the ending portion are transmitted to the reproducing apparatus 103 (step S709).

Still further, when reproduction time Tr of the video data is longer than the reproduction time (Th+Ta+Tb+Ti) of the parts except for only the ending portion (step S708: "NO"), the music DB 101 selects all the parts of the entire music, and all the parts of the entire music are transmitted to the reproducing apparatus 103 (step S710).

When the music DB 101 performs the part-construction processing of the music-reproduction data as described above, the music DB 101 may previously obtain and records the part construction information such as the priority order in part selection and the part construction rule for each piece of music from the reproducing apparatus 103, so that they can be made use of in the part construction generation processing.

3. Other Embodiments

In the above embodiment, the reproduction time of the video data to be played is compared with the reproduction time of the selected music data, and in accordance with whether which of the reproduction times is longer, part construction data including a combination of parts to be played (music-reproduction data) is generated for the selected music, and the music-reproduction data are constituted so that the reproduction time of the music-reproduction data has almost the same length as the reproduction time of the video data. Alternatively, or in combination with the above method, the tempo of the selected music may be changed so that the reproduction time of the music-reproduction data has almost the same length as the reproduction time of the video data.

More specifically, when the reproduction time of the video data to be played is shorter than the reproduction time of the selected music data, the music data may be compressed so that the tempo of the music data is increased. In the opposite case, the reproduction tempo of the music data may be reduced.

In the above embodiment, the music DB is provided outside of the reproducing apparatus, and connects to the reproducing apparatus via the network. Alternatively, a music DB having similar functions may be provided within the main body of the reproducing apparatus. That is, the ranking data may not be obtained by sending an inquiry to an external music DB during reproduction. Alternatively, the ranking data may be stored in a storage section provided in the reproducing apparatus, and the music selection processing may be performed using the ranking data.

Further, the genre to be used in the music selection processing may not be specified by a user. Alternatively, genre specification information may be generated from a scene of a video signal.

Still further, still picture data are used as video data, and a selected music may be used as BGM when, e.g., still pictures are reproduced as slide show.

The present invention relates to a reproducing apparatus and a reproducing system for reproducing video data took by a video camera and the like, and a server therefor, and more particularly, the present invention can be effectively used for a reproducing apparatus and a reproducing system capable of reproducing video data as well as BGM by inserting the BGM, and a server to be used therefor.

What is claimed is:

1. A reproducing apparatus comprising:
   a storage device that stores one or more video data;
   a user interface that accepts a user selection for selecting video data of the one or more video data stored in the storage device;
   a receiving unit that receives music-reproduction data from an external server via a network, the received music-reproduction data comprising a combination of parts of music, each of the parts of the music having a respective priority number for playback, the parts of the music being automatically selected as a result of a comparison between a reproduction time length of the combination of the parts of the music of the music-reproduction data and a reproduction time length of the selected video data, and the automatically selected parts of the music being arranged in the music-reproduction data in a decreasing order of priority based on the priority number of each of the selected parts of the music; and
   a reproduction controller that simultaneously reproduces the music-reproduction data received from the external server and the user selected video data.

2. The reproducing apparatus according to claim 1, wherein the combination of the parts of the music includes a hook-line portion of the music.

3. The reproducing apparatus according to claim 2,
   wherein the receiving unit receives, from the external server via the network, part information about the combination of the parts of the music, the part information including the reproduction time of each of the parts of the music, and
   wherein the reproducing apparatus further comprises a processing unit that compares the reproduction time of each of the parts of the music received by the receiving unit and the reproduction time of the one or more video data stored in the storage device, so as to perform part-construction processing of the music-reproduction data.

4. The reproducing apparatus according to claim 2 further comprising a transmitting unit that transmits, to the external server via the network, information about the reproduction time of the one or more video data stored in the storage device,
   wherein the external server performs part-construction processing of the music-reproduction data, the part-construction processing being performed by comparing a reproduction time of each of the parts of the music and the reproduction time of the one or more video data.

5. The reproducing apparatus according to claim 1,
   wherein the receiving unit receives, from the external server via the network, part information about the combination of the parts of the music, the part information including the reproduction time of each of the parts of the music, and
   wherein the reproducing apparatus further comprises a processing unit that compares the reproduction time of each of the parts of the music received by the receiving unit and the reproduction time of the one or more video data stored in the storage device, so as to perform part-construction processing of the music-reproduction data.

6. The reproducing apparatus according to claim 1 further comprising a transmitting unit that transmits, to the external server via the network, information about the reproduction time of the one or more video data stored in the storage device,
   wherein the external server performs part-construction processing of the music-reproduction data, the part-construction processing being performed by comparing a reproduction time of each of the parts of the music and the reproduction time of the one or more video data.

7. The reproducing apparatus according to claim 1,
   wherein the receiving unit receives ranking data of a particular date/time from the external server via the network, and
   wherein the reproducing apparatus further comprises a selecting section that selects a part of the music to be reproduced together with the selected video data to be currently reproduced based on the ranking data received by the receiving unit and data about a part of the music already reproduced together with already reproduced video data.

8. A reproducing system comprising:
   a reproducing apparatus that reproduces video data; and
   an external server (i) connected to the reproducing apparatus via a network and (ii) transmitting, to the reproducing apparatus, music-reproduction data to be played together with the video data,
   wherein the reproducing apparatus includes:
      storage device that stores one or more video data;
      a user interface that accepts a user selection for selecting video data of the one or more video data stored in the storage device;
      a receiving unit that receives the music-reproduction data from the external server via the network, the received music-reproduction data comprising a combination of parts of music, each of the parts of the music having a respective priority number for playback, the parts of the music being automatically selected as a result of a comparison between a reproduction time length of the combination of the parts of the music of the music-reproduction data and a reproduction time length of the selected video data, and the automatically selected parts of the music being arranged in the music-reproduction data in a decreasing order of priority based on the priority number of each of the selected parts of the music; and
      a reproduction controller that simultaneously reproduces the music-reproduction data received from the external server and the user selected video data.

9. The reproducing system according to claim 8, wherein the combination of the parts of the music includes a hook-line portion of the music.

10. The reproducing system according to claim 9,
    wherein the receiving unit receives, from the external server via the network, part information about the combination of the parts of the music, the part information including the reproduction time of each of the parts of the music, and wherein the reproducing apparatus further comprises a processing unit that compares the reproduction time of each of the parts of the music received by the receiving unit and the reproduction time of the one or more video data stored in the storage device, so as to perform part-construction processing of the music-reproduction data.

11. The reproducing system according to claim 9 further comprising a transmitting unit that transmits, to the external server via the network, information about the reproduction time of the one or more video data stored in the storage device,
wherein the external server performs part-construction processing of the music-reproduction data, the part-construction processing being performed by comparing a reproduction time of each of the parts of the music and the reproduction time of the one or more video data.

12. The reproducing system according to claim 8,
wherein the receiving unit receives, from the external server via the network, part information about the combination of the parts of the music, the part information including the reproduction time of each of the parts of the music, and
wherein the reproducing apparatus further comprises a processing unit that compares the reproduction time of each of the parts of the music received by the receiving unit and the reproduction time of the one or more video data stored in the storage device, so as to perform part-construction processing of the music-reproduction data.

13. The reproducing system according to claim 8 further comprising a transmitting unit that transmits, to the external server via the network, information about the reproduction time of the one or more video data stored in the storage device,
wherein the external server performs part-construction processing of the music-reproduction data, the part-construction processing being performed by comparing a reproduction time of each of the parts of the music and the reproduction time of the one or more video data.

14. The reproducing system according to claim 8,
wherein the receiving unit receives ranking data of a particular date/time from the external server via the network, and
wherein the reproducing apparatus further comprises a selecting section that selects a part of the music to be reproduced together with the selected video data to be currently reproduced based on the ranking data received by the receiving unit and data about a part of the music already reproduced together with already reproduced video data.

15. A server comprising:
a storage device that stores one or more music data comprising parts of music;
a receiving unit that receives, from an external apparatus via a network, information about a reproduction time length of selected video data stored in the external apparatus; and
a processing unit that processes music-reproduction data comprising a combination of the parts of the music stored in the storage device, each of the parts of the music having a respective priority number for playback,
wherein the processing unit automatically selects the combination of the parts of the music as a result of a comparison between a reproduction time length of the combination of the parts of the music of the music-reproduction data and the reproduction time of the selected video data, and
wherein the processing unit arranges the automatically selected parts of the music in the music-reproduction data in a decreasing order of priority based on the priority number of each of the selected parts of the music.

* * * * *